(12) United States Patent
Wagoner et al.

(10) Patent No.: US 8,853,876 B1
(45) Date of Patent: Oct. 7, 2014

(54) SWITCHING-BASED CONTROL FOR A POWER CONVERTER

(71) Applicant: General Electric Company, Schenectady, NY (US)

(72) Inventors: Robert Gregory Wagoner, Roanoke, VA (US); Cornelius Edward Holliday, Forest, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/871,309

(22) Filed: Apr. 26, 2013

(51) Int. Cl.
*H02P 9/00* (2006.01)
*F03D 7/02* (2006.01)

(52) U.S. Cl.
CPC ................ *F03D 7/0276* (2013.01)
USPC .................................................. 290/44

(58) Field of Classification Search
CPC ................................... H02P 2009/004
USPC .................................................. 290/44
See application file for complete search history.

(56) References Cited

U.S. PATENT DOCUMENTS

| | | | |
|---|---|---|---|
| 5,225,712 A * | 7/1993 | Erdman | 290/44 |
| 6,750,633 B2 * | 6/2004 | Schreiber | 322/12 |
| 7,095,128 B2 * | 8/2006 | Canini et al. | 290/44 |
| 7,215,035 B2 * | 5/2007 | Hudson | 290/44 |
| 7,629,705 B2 * | 12/2009 | Barker et al. | 290/55 |
| 2002/0079706 A1 * | 6/2002 | Rebsdorf et al. | 290/55 |
| 2007/0052244 A1 * | 3/2007 | Hudson | 290/44 |
| 2007/0273155 A1 * | 11/2007 | Barton et al. | 290/44 |
| 2009/0079193 A1 * | 3/2009 | Nielsen et al. | 290/44 |
| 2010/0133831 A1 * | 6/2010 | Scholte-Wassink et al. | 290/44 |
| 2011/0101689 A1 * | 5/2011 | Larsen et al. | 290/44 |
| 2013/0307271 A1 * | 11/2013 | Langel | 290/44 |

FOREIGN PATENT DOCUMENTS

EP 1914877 A2 * 4/2008
WO WO 2010058028 A2 * 5/2010

* cited by examiner

*Primary Examiner* — Joseph Waks
(74) *Attorney, Agent, or Firm* — Dority & Manning, P.A.

(57) ABSTRACT

A method for operating a power generation system that supplies power for application to a load is disclosed. The method may generally include receiving, at a power converter, an alternating current power generated by a generator operating at a speed that is substantially equal to its synchronous speed and converting, with the power converter, the alternating current power to an output power, wherein the power converter includes at least one switching element. In addition, the method may include receiving a control command to control a switching frequency of the at least one switching element and adjusting the switching frequency to an adjusted switching frequency that is substantially equal to a fundamental frequency of the load.

19 Claims, 7 Drawing Sheets

| GENERATOR ROTOR RPM | ROTOR FUNDAMENTAL FREQUENCY | IGBT SWITCHING FREQUENCY | IGBT/DIODE PEAK JUNCTION TEMPERATURE |
|---|---|---|---|
| 1600 | 20 Hz | ~2 KHz | 100.6 C |
| 1400 | 10 Hz | ~2 KHz | 102.7 C |
| 1300 | 5 Hz | ~2 KHz | 107.8 C |
| 1250 | 2.5 Hz | ~2 KHz | 114.0 C |
| 1220 | 1 Hz | ~2 KHz | 117.9 C |
| 1200 | DC (0 Hz) | ~2 KHz | 119.9 C |
| 1200 | DC (0 Hz) | 60 Hz | 87.7 C |

FIG. —7—

SWITCHING-BASED CONTROL FOR A POWER CONVERTER

FIELD OF THE INVENTION

The present subject matter relates generally to power convertors for power generation systems and, more particularly, to a system and method for operating a power converter used in a DFIG wind turbine system when the generator is operated at speeds at or close to its synchronous speed.

BACKGROUND OF THE INVENTION

Power generation systems often include a power converter that is configured to convert an input power into a suitable power for application to a load, such as a generator, motor, electrical grid, or other suitable load. For instance, a power generation system, such as a wind turbine system, may include a power converter for converting variable frequency alternating current power generated at the generator into alternating current power at a grid frequency (e.g. 50 Hz or 60 Hz) for application to a utility grid. An exemplary power generation system may generate AC power using a wind-driven doubly fed induction generator (DFIG). A power converter can regulate the flow of electrical power between the DFIG and the grid.

Figure 1:
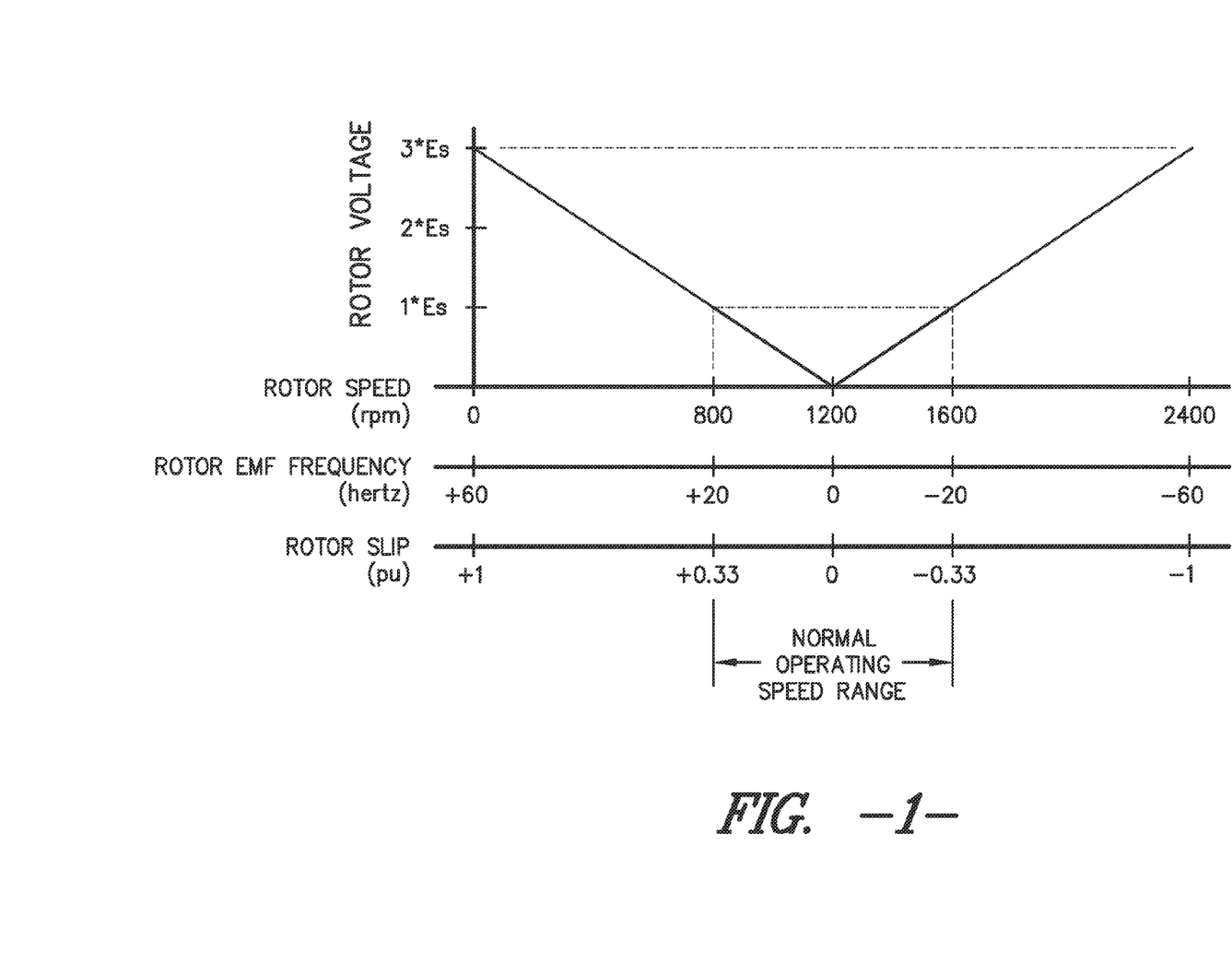
FIG. 1 illustrates a graphical representation of the relationship between rotor voltage and rotor speed for a typical DFIG generator.

In general, the output parameters of a DFIG generator typically vary as its rotor speed is adjusted across the generator's operating speed range. For example, FIG. 1 illustrates a graphical representation of the relationship between rotor voltage and rotor speed for a typical 60 Hz DFIG (e.g., a DFIG having a turns ratio of 3, a synchronous rotor speed of 1200 RPM and an operating speed range from 800 RPM to 1600 RPM). As shown, at the extremes of its operating speed range, the DFIG has a rotor slip of +/−0.33, a rotor frequency of +/−20 Hz. In addition, the rotor emf magnitude is generally equal to the stator emf magnitude. However, as the rotor speed is increased or decreased towards the synchronous speed, such output parameters generally approach zero. For example, as shown in FIG. 1, the rotor frequency crosses through DC at the synchronous speed.

Figure 2:
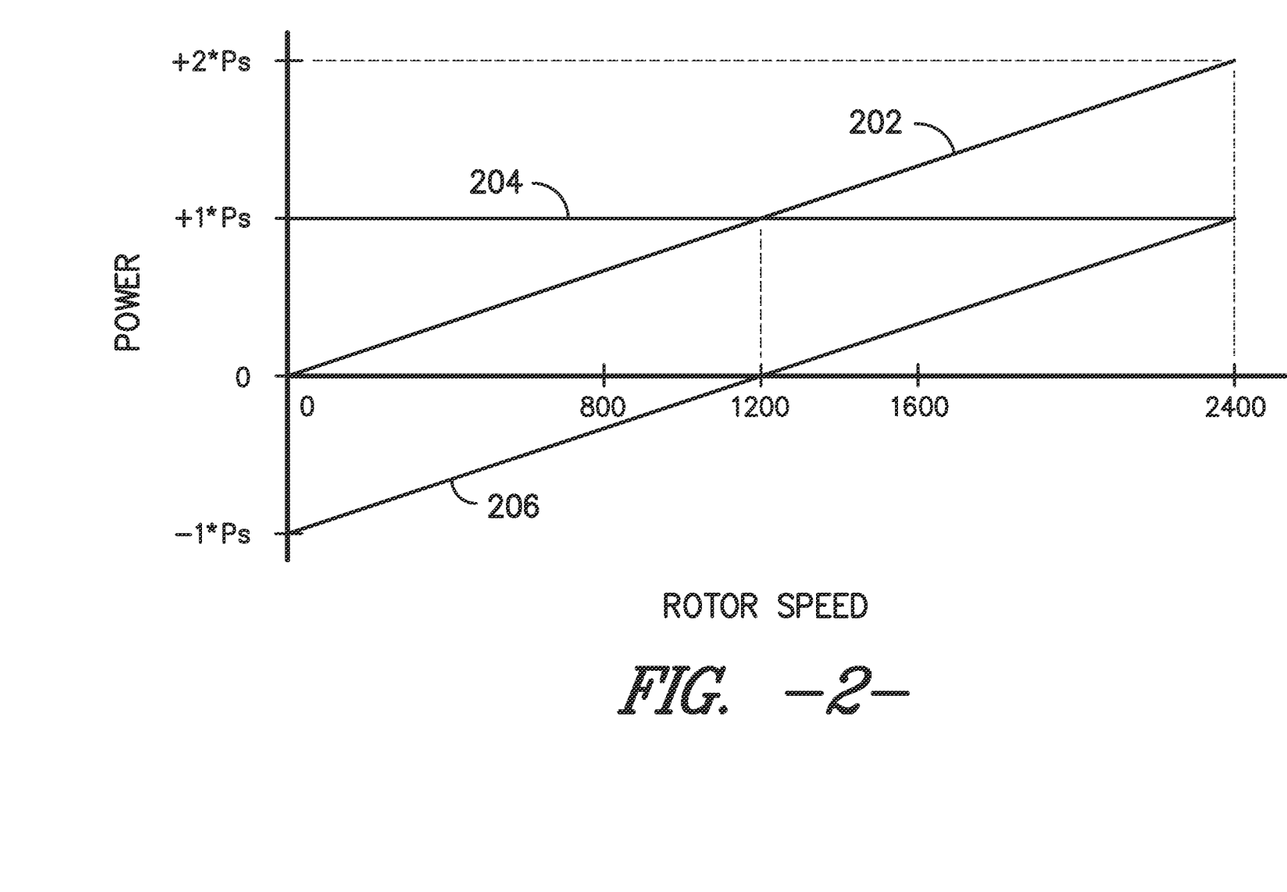
FIG. 2 illustrates a graphical representation of the relationship between power and rotor speed for a typical DFIG generator.

Additionally, FIG. 2 illustrates a graphical representation of the relationship between power and rotor speed for the same 60 Hz DFIG (assuming that a constant power is delivered from the DFIG's stator). The total power (line 202) flowing from the DFIG to the grid may be expressed as the summation of the stator power (line 204) and the rotor power (line 206), with the rotor power 206 being a function of the rotor speed. As shown in FIG. 2, for rotor speeds above the synchronous speed (i.e., super-synchronous speeds), the rotor power 206 is positive and flows from the rotor into the grid. In contrast, for rotor speeds below the synchronous speed (i.e., sub-synchronous speeds), the rotor power 206 is negative and flows from the grid into the rotor. However, when the rotor speed is equal to the synchronous speed (e.g., 1200 RPM), the rotor power 206 is equal to zero.

At or near the synchronous speed of a DFIG system, conventional power converters typically operate at relatively constant current, and consequently the average power loss in an IGBT remains relatively constant. However, as shown in FIG. 1, as the generator speed approaches the synchronous speed, the rotor fundamental frequency approaches DC. Because the transient thermal resistance of the IGBT increases at low frequency, the peak temperature of the rotor side IGBT increases at or near the synchronous speed, resulting in a reduction of the total output current capability of the rotor side of the converter. In addition, operation of a DFIG generator at or near synchronous speed is even more complicated because current harmonics feed through the generator from the rotor side to the stator side and then directly to the transmission utility grid. These harmonics must be controlled to levels dictated by utility grid harmonic requirements. As the speed of the generator approaches the synchronous speed of a DFIG system, the thermal cycling of the IGBT junction increases, again based on the transient thermal resistance of the IGBT, which leads to the switching elements wearing out prematurely.

Accordingly, a system and method that operates a power converter in a way to reduce the power loss of the convertor's switching elements when a generator is operating at or near its synchronous speed would be welcomed in the technology. Ideally the power loss reduction at or near the synchronous speed of a DFIG system would allow a converter to operate without reducing the total output current capability of the rotor side of the converter.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for operating a power generation system that supplies power for application to a load. The method may generally include receiving, at a power converter, an alternating current power generated by a generator operating at a speed that is substantially equal to its synchronous speed and converting, with the power converter, the alternating current power to an output power, wherein the power converter includes at least one switching element. In addition, the method may include receiving a control command to control a switching frequency of the at least one switching element and adjusting the switching frequency to an adjusted switching frequency that is substantially equal to a fundamental frequency of the load.

In another aspect, the present subject matter is directed to a power generation system for supplying power for application to a load. The power generation system may generally include a generator and a power converter coupled to the generator. The power converter may include at least one switching element. In addition, the power generation system may include a controller configured to provide control commands to adjust a switching frequency of the at least one switching element. The controller may be configured to adjust the switching frequency to an adjusted switching frequency that is substantially equal to a fundamental frequency of the load when the generator is operating at a speed that is substantially equal to its synchronous speed.

In a further aspect, the present subject matter is directed to a wind turbine system for supplying power for application to a load. The system may generally include a wind turbine rotor and a doubly fed induction generator coupled to the wind turbine rotor. The system may also include a power converter coupled to the doubly fed induction generator. The power converter may include a rotor side converter and a line side converter. The rotor side converter may include at least one switching element. In addition, the system may include a controller configured to provide control commands to adjust a switching frequency of the at least one switching element. The controller may be configured to adjust the switching frequency to an adjusted switching frequency that is substantially equal to a fundamental frequency of the load when the doubly fed induction generator is operating at a speed that is substantially equal to its synchronous speed.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for operating a power generation system, such as doubly fed induction generator (DFIG) wind turbine system. In particular, the present subject matter is directed to a system and method for operating a power converter of a wind-driven DFIG in a manner that reduces the power loss of the convertor's switching elements when the generator is operating at or near its synchronous speed. For example, a DFIG is typically operated at super-synchronous speeds. However, during specific operating modes (e.g., during a noise-reduced operating mode of the wind turbine system), the generator may be operated at speeds at or near its synchronous speed. In such instances, it has been determined by the inventors of the present subject matter that the performance of the power convertor may be enhanced by reducing the switching frequency of the switching elements to a frequency at or close to the fundamental frequency of the grid (e.g., 50 Hz or 60 Hz).

Typically, the switching frequency on the rotor side of a DFIG power convertor is maintained at an elevated frequency (e.g., about 2000 or 3000 Hz) for all rotor speeds within the generator's operating speed range. However, while such an elevated switching frequency is desirable for most operating speeds, it can present problems when the generator is operated at or near it synchronous speed. For example, at the synchronous speed, the elevated switching frequency results in a higher stress on the switching elements (e.g., due to both an increased peak temperature and increased thermal cycling stresses), which may cause a de-rating of the total output current capability of the rotor side of the converter and may also lead to the switching elements wearing out prematurely. In addition, the elevated switching frequency may also lead to increased harmonics at the synchronous speed.

By reducing the switching frequency with reductions in the generator speed, the problems described above may be overcome. Specifically, by adjusting the switching frequency to a frequency at or near the fundamental frequency of the grid when the generator is operated at or near to its synchronous speed, the power loss in the switching elements may be significantly reduced. With such a reduction in power loss, the temperature rise in the switching elements may also be reduced, which may provide an extra margin in the output current capability of the power convertor and may also increase the component life of the switching elements. In addition, by closely matching the switching frequency with the fundamental frequency of the grid, a reduction in the amount of harmonics fed through to the line side of the converter may also be obtained, thereby decreasing the harmonic distortion to the grid.

Figure 3:
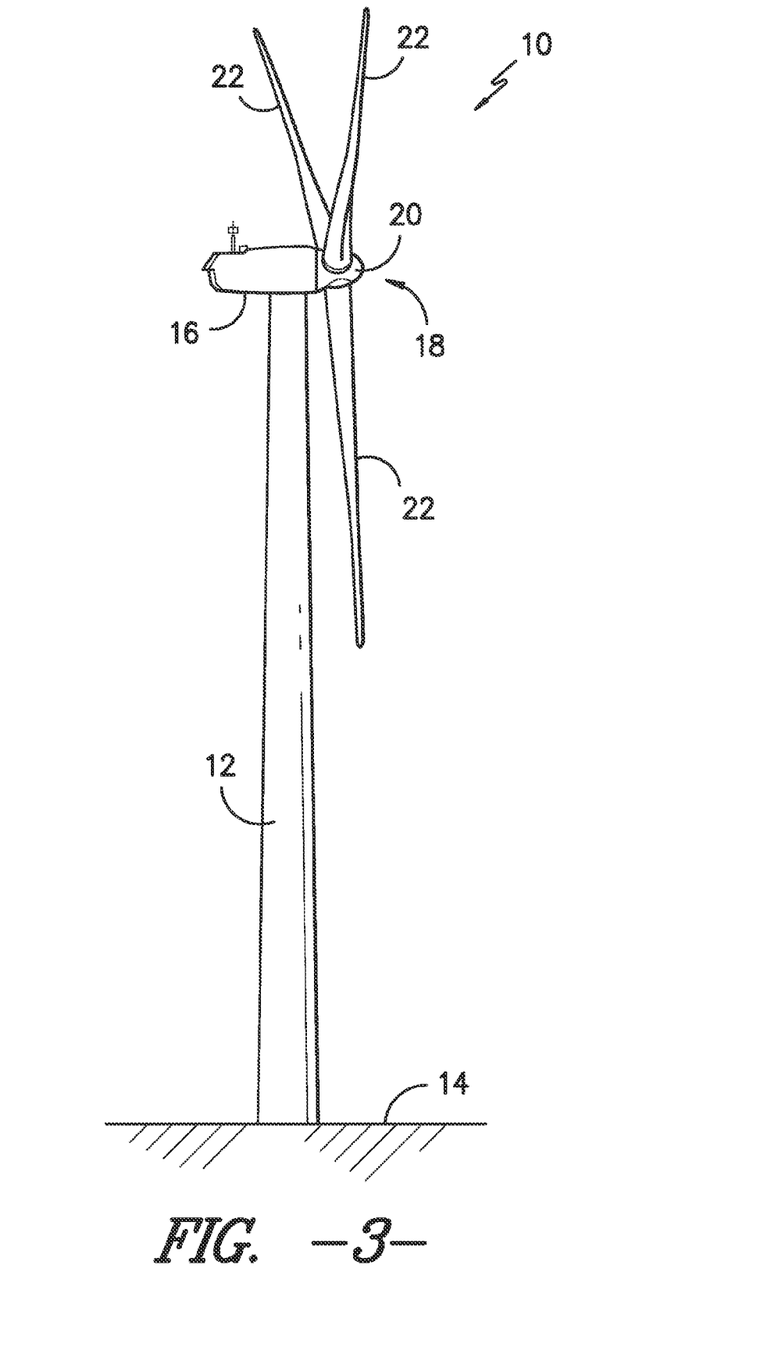
FIG. 3 perspective view of one embodiment of a wind turbine.

Referring now to the drawings, FIG. 3 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, as will be described below, the rotor 18 may be rotatably coupled to an electric generator 120 (FIG. 4) to permit electrical energy to be produced.

Figure 4:
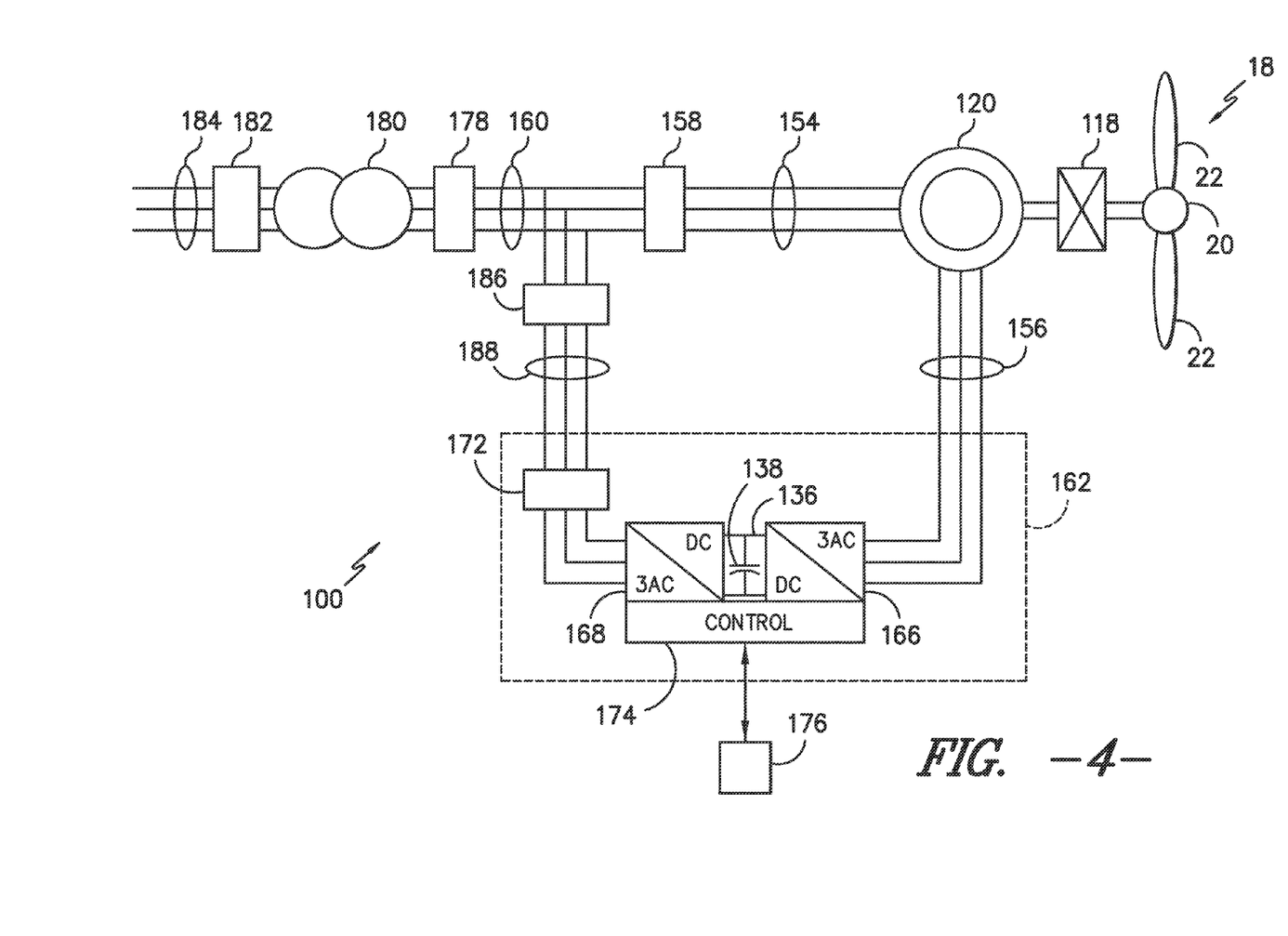
FIG. 4 illustrates a schematic diagram of one embodiment of a DFIG wind turbine system in accordance with aspects of the present subject matter.

Referring now to FIG. 4, a schematic diagram of one embodiment of a DFIG wind turbine system 100 is illustrated in accordance with aspects of the present subject matter. It should be appreciated that the present subject matter will generally be described herein with reference to the system 100 shown in FIG. 4. However, those of ordinary skill in the art, using the disclosures provided herein, should understand that aspects of the present disclosure may also be applicable in other power generation systems.

As shown, the rotor 18 of the wind turbine 10 (FIG. 3) may, optionally, be coupled to a gear box 118, which is, in turn, coupled to a generator 120. In accordance with aspects of the present disclosure, the generator 120 is a doubly fed induction generator (DFIG).

As shown, the DFIG 120 may be coupled to a stator bus 154 and a power converter 162 via a rotor bus 156. The stator bus 154 may provide an output multiphase power (e.g. three-phase power) from a stator of the DFIG 120 and the rotor bus 156 may provide an output multiphase power (e.g. three-phase power) from a rotor of the DFIG 120. As shown in FIG. 2, the power converter 162 includes a rotor side converter 166 and a line side converter 168. The DFIG 120 may be coupled via the rotor bus 156 to the rotor side converter 166. Additionally, the rotor side converter 166 may coupled to the line side converter 168 which may, in turn, be coupled to a line side bus 188.

In several embodiments, the rotor side converter 166 and the line side converter 168 may be configured for normal operating mode in a three-phase, pulse width modulation (PWM) arrangement using insulated gate bipolar transistor (IGBT) switching elements as will be discussed in more detail with respect to FIG. 5. The rotor side converter 166 and the line side converter 168 may be coupled via a DC link 136 across which is a DC link capacitor 138.

In addition, the power converter 162 may be coupled to a controller 174 in order to control the operation of the rotor side converter 166 and the line side converter 168. It should be noted that the controller 174 may, in several embodiments, be configured as an interface between the power converter 162 and a control system 176. The controller 174 may include any number of control devices. In one embodiment, the controller 174 may include a processing device (e.g. microprocessor, microcontroller, etc.) executing computer-readable instructions stored in a computer-readable medium. The instructions when executed by the processing device may cause the processing device to perform operations, including providing control commands (e.g. switching frequency commands) to the switching elements of the power converter 162.

In typical configurations, various line contactors and circuit breakers including, for example, a grid breaker 182 may also be included for isolating the various components as necessary for normal operation of the DFIG 120 during connection to and disconnection from the electrical grid 184. For example, a system circuit breaker 178 may couple the system bus 160 to a transformer 180, which may be coupled to the electrical grid 184 via the grid breaker 182. In alternative embodiments, fuses may replace some or all of the circuit breakers.

In operation, alternating current power generated at the DFIG 120 by rotating the rotor 18 is provided via a dual path to the electrical grid 184. The dual paths are defined by the stator bus 154 and the rotor bus 156. On the rotor bus side 156, sinusoidal multi-phase (e.g. three-phase) alternating current (AC) power is provided to the power converter 162. The rotor side power converter 166 converts the AC power provided from the rotor bus 156 into direct current (DC) power and provides the DC power to the DC link 136. As is generally understood, switching elements (e.g. IGBTs) used in the bridge circuits of the rotor side power converter 166 may be modulated to convert the AC power provided from the rotor bus 156 into DC power suitable for the DC link 136.

In addition, the line side converter 168 converts the DC power on the DC link 136 into AC output power suitable for the electrical grid 184. In particular, switching elements (e.g. IGBTs) used in bridge circuits of the line side power converter 168 can be modulated to convert the DC power on the DC link 136 into AC power on the line side bus 188. The AC power from the power converter 162 can be combined with the power from the stator of DFIG 120 to provide multi-phase power (e.g. three-phase power) having a frequency maintained substantially at the frequency of the electrical grid 184 (e.g. 50 Hz or 60 Hz).

Additionally, various circuit breakers and switches, such as grid breaker 182, system breaker 178, stator sync switch 158, converter breaker 186, and line contactor 172 may be included in the system 100 to connect or disconnect corresponding buses, for example, when current flow is excessive and may damage components of the wind turbine system 100 or for other operational considerations. Additional protection components may also be included in the wind turbine system 100.

Moreover, the power converter 162 may receive control signals from, for instance, the control system 176 via the controller 174. The control signals may be based, among other things, on sensed conditions or operating characteristics of the wind turbine system 100. Typically, the control signals provide for control of the operation of the power converter 162. For example, feedback in the form of a sensed speed of the DFIG 120 may be used to control the conversion of the output power from the rotor bus 156 to maintain a proper and balanced multi-phase (e.g. three-phase) power supply. In particular, as will be described below, the sensed speed may be used as a basis for adjusting the switching frequency of the switching elements (e.g., when the DIFG 120 is operating at its synchronous speed). Other feedback from other sensors may also be used by the controller 174 to control the power converter 162, including, for example, stator and rotor bus voltages and current feedbacks. Using the various forms of feedback information, switching control signals (e.g. gate timing commands for IGBTs), stator synchronizing control signals, and circuit breaker signals may be generated.

Figure 5:
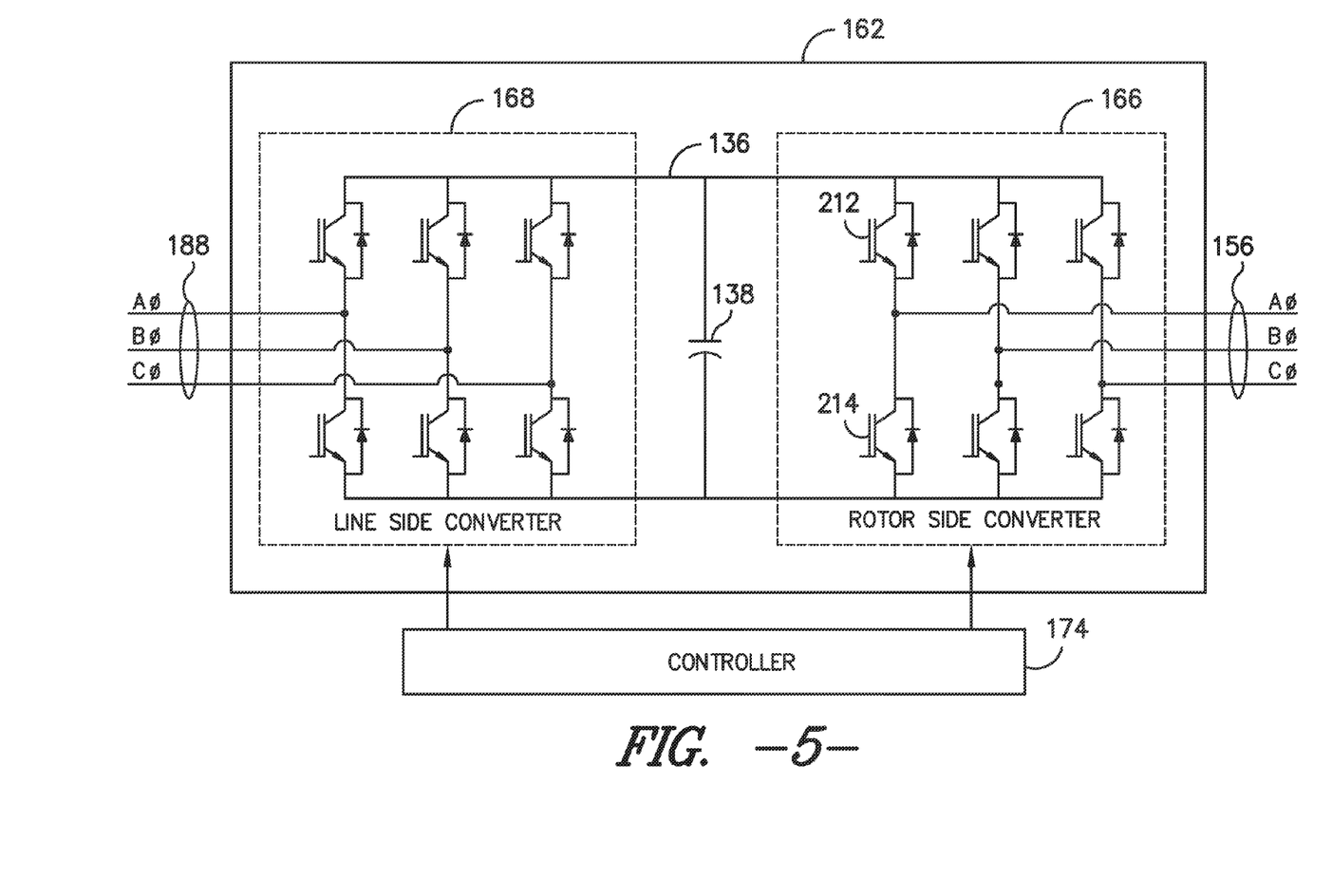
FIG. 5 illustrates a schematic diagram of one embodiment of a power converter suitable for use with the DFIG wind turbine system shown in FIG. 4.

Referring now to FIG. 5, a schematic diagram of one embodiment of the power converter shown in FIG. 4 is illustrated in accordance with aspects of the present subject matter. As shown, the rotor side converter 166 includes a plurality of bridge circuits (e.g. H-bridge circuits), with each phase of the rotor bus 156 input to the rotor side converter 166 being coupled to a single bridge circuit. In addition, the line side converter 168 may also include a plurality of bridge circuits. Similar to the rotor side converter 166, the line side converter 168 also includes a single bridge circuit for each output phase of the line converter 168. In other embodiments, the line side converter 168, the rotor side converter 166, or both the line side converter 168 and the rotor side converter 166 may include parallel bridge circuits without deviating from the scope of the present disclosure.

Each bridge circuit may generally include a plurality of switching elements (e.g. IGBTs) coupled in series with one another. For instance, as shown in FIG. 5, each bridge circuit includes an upper IGBT (e.g. IGBT 212) and a lower IGBT (e.g. IGBT 214). In addition, a diode may be coupled in parallel with each of the IGBTs. In alternative embodiments, parallel IGBTs and diodes may be used to increase the current rating of the converter. As is generally understood, the line side converter 168 and the rotor side converter 166 may be controlled, for instance, by providing control commands, using a suitable driver circuit, to the gates of the IGBTs. For example, the controller 174 may provide suitable gate timing commands to the gates of the IGBTs of the bridge circuits. The control commands may control the switching frequency of the IGBTs to provide a desired output. It should be appreciated by those of ordinary skill in the art that, as an alternative to IGBTs, the power convertor 162 may include any other suitable switching elements.

Figure 6:
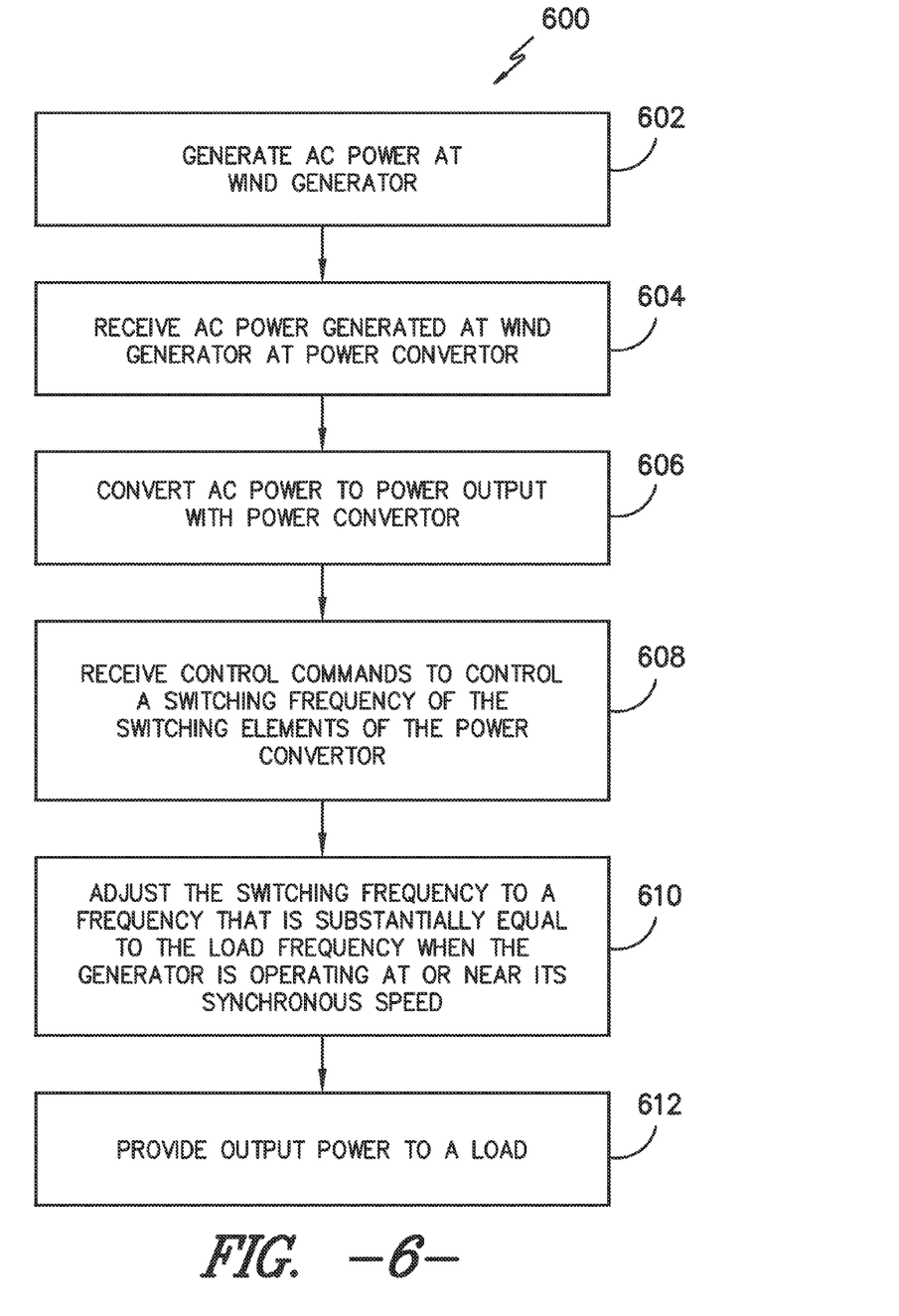
FIG. 6 illustrates a flow diagram of one embodiment of a method for operating a power generation system (such as the DFIG wind turbine system shown in FIG. 4) in accordance with aspects of the present subject matter.

Referring now to FIG. 6, a flow diagram of one embodiment of a method 600 for operating a power generation system is illustrated in accordance with aspects of the present subject matter. In general, the method 600 will be described herein as being implemented using a wind turbine system, such as the DFIG wind turbine system 100 described above with reference to FIG. 4. However, it should be appreciated that the disclosed method 600 may be implemented using any other suitable power generation system that is configured to supply power for application to a load. In addition, although FIG. 6 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

At (602), the method 600 includes generating alternating current power at a wind-driven generator. For instance, alternating current power may be generated at a rotor of a wind-driven DFIG. The alternating current power may be a multiphase alternating current power, such as a three-phase alternating current power. The generated alternating current power may be provided to a rotor bus such that the alternating current power can be received at a power converter (604).

At (606), the alternating current power generated at the wind-driven generator is converted by the power converter to an output power suitable for application to a load (e.g., to an electrical grid). The power converter may, in several embodiments, include a plurality of switching elements. As is generally understood, the pulse width modulation of the switching elements may be controlled to provide a suitable output power for application to a load.

For instance, as described above, the power converter may be a two-stage power converter that includes a rotor side converter and a line side converter coupled together by a DC link. The rotor side converter and the line side converter may each include a plurality of bridge circuits, with each bridge circuit including a plurality of switching elements coupled in series with one another. The switching elements of the bridge circuits in the rotor side converter may be controlled to convert the alternating current power to a DC power for application to the DC link. The line side converter may include a plurality of bridge circuits for converting the DC power on the DC link to an output power suitable for application to the load.

At (608), the method 600 includes receiving a control command to control a switching frequency of the switching elements. In general, control commands may be received by the power convertor from a controller in order to control the switching frequency of its switching elements. As indicated above, the switching frequency is typically maintained at an elevated switching frequency (e.g., 2000 Hz or 3000 Hz) regardless of the operating speed of the wind-driven generator. However, in accordance with aspects of the present subject matter, the switching frequency may be adjusted when the wind-driven generator is operating at a speed that is substantially equal to its synchronous speed. In such instances, suitable control commands may be transmitted from the controller to the power convertor to appropriately adjust the switching frequency (e.g., to a frequency that is substantially equal to the fundamental load frequency, as will be described below).

It should be appreciated that, as indicated above, the "synchronous speed" of a generator generally refers to the speed at which the rotor current is equal to DC current. In addition, it should be appreciated that the operating speed of a generator may be "substantially equal" to its synchronous speed when the operating speed is within +/−10% of the synchronous speed, such as by operating the generator at a speed of within +/−5% of the synchronous speed or at a speed of within +/−2.5% of the synchronous speed and any other subranges therebetween.

At (610), when the operating speed of the wind-driven generator is reduced to or is otherwise at a speed that is substantially equal to its synchronous speed, the switching frequency of the switching elements may be adjusted to a frequency that is substantially equal to the fundamental frequency of the load. For example, when the load comprises an electrical grid, the switching frequency may be adjusted to a frequency that is substantially equal to the grid frequency (e.g., 50 Hz or 60 Hz). As indicated above, by reducing the switching frequency in this manner when the generator is operating at or near its synchronous speed, the power losses, as well as the temperature-induced stresses, associated with the switching elements may be reduced significantly, thereby enhancing the overall performance of the power convertor (e.g., by increasing the output current capability). In addition, the amount of harmonic-based distortion transmitted to the grid may also be reduced significantly.

It should be appreciated that the switching frequency may be "substantially equal" to the fundamental frequency of the load (e.g., the grid frequency) when the switching frequency is within +/−10% of the fundamental frequency, such as when the switching frequency is within +/−5% of the fundamental frequency or within +/−2.5% of the fundamental frequency and any other subranges therebetween. In addition, it should be appreciated that, in several embodiments, the switching frequency may be considered to be "substantially equal" to the fundamental frequency when the difference between the switching frequency and the slip frequency of the generator is within +/−10% of the fundamental frequency. For instance, in such embodiments, assuming that the fundamental frequency is 60 Hz and the slip frequency of the generator is 2 Hz, the switching frequency may be "substantially equal" to the fundamental frequency if the switching frequency, less 2 Hz, is equal to a frequency that is within +/−10% of 60 Hz.

It should also be appreciated that, as indicated above, the power converter may, in several embodiments, be a two-stage power converter that includes a rotor side converter and a line side converter coupled together by a DC link. In such embodiments, the switching frequency of the switching elements forming part of the rotor side convertor may be adjusted so as to be substantially equal to the fundamental frequency when the wind-driven generator is operating at or near its synchronous speed.

At (512), the output power is provided from the power converter to a load. As indicated above, the load may be an electrical grid. However, in other embodiments, the load may be a motor, resistive load or any other load. It should be appreciated that, while an electrical grid is traditionally a supplier of power, the electrical grid may act as a load for the disclosed wind turbine system 100.

Figure 7:
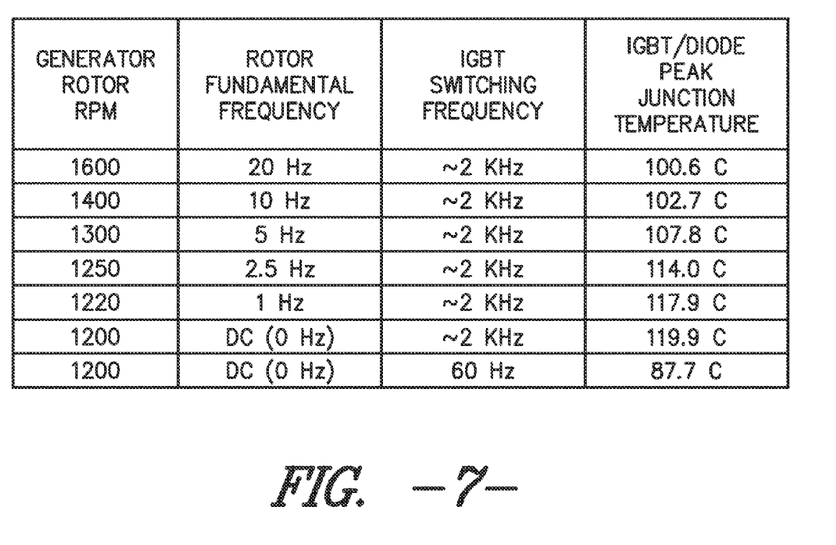
FIG. 7 illustrates a data table showing the difference in peak junction temperatures achieved at synchronous speed using conventional control methodologies and using the method disclosed herein.

Referring now to FIG. 7, an example data table is provided that shows the difference in peak junction temperatures achieved at various operating speeds, including synchronous speed, for a typical 60 Hz DFIG using both a conventional control methodology and the method 600 disclosed herein. All of the examples in FIG. 7 operate at the same rotor current. As indicated above, conventional methodologies maintain the switching frequency on the rotor side of the power convertor at an elevated frequency for all rotor speeds, which leads to an increase in the IGBT/diode peak junction temperatures at speeds at or near the synchronous speed. For example, as shown in FIG. 7, by maintaining the switching frequency at 2000 Hz as the rotor speed approaches synchronous speed (e.g., 1200 RPM), the peak junction temperature rises significantly (e.g., to about 120° C.). However, by adjusting the switching frequency to the fundamental load frequency at synchronous speed, the peak junction temperature may be significantly reduced (e.g., to about 88° C.). In fact, as shown in FIG. 7, the resulting temperature achieved using the disclosed method 600 may be significantly lower than the temperatures achieved at other rotor speeds, thereby providing an extra margin in the output current capability of the power convertor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a power generation system that supplies power for application to a load, the method comprising:
   receiving, at a power converter, an alternating current power generated by a generator operating at a rotor speed that is substantially equal to its synchronous speed;
   converting, with the power converter, the alternating current power to an output power, the power convertor including at least one switching element;
   receiving a control command to control a switching frequency of the at least one switching element; and
   adjusting the switching frequency to a frequency that is substantially equal to a fundamental frequency of the load.

2. The method of claim 1, wherein the frequency is within +/−5% of the fundamental frequency.

3. The method of claim 1, wherein the rotor speed is within about +/−5% of the synchronous speed.

4. The method of claim 1, wherein the load comprises an electrical grid and wherein the fundamental frequency is equal to about 50 Hz or about 60 Hz.

5. The method of claim 1, wherein the power converter comprises a rotor side converter and a line side converter, the at least one switching element forming part of the rotor side converter.

6. The method of claim 1, wherein the generator is a wind-driven doubly fed induction generator.

7. The method of claim 1, wherein the at least one switching element comprises an insulated gate bipolar transistor (IGBT).

8. A power generation system for supplying power for application to a load, the power generation system comprising:
   a generator
   a power converter coupled to the generator, the power converter including at least one switching element; and
   a controller configured to provide control commands to adjust a switching frequency of the at least one switching element, wherein the controller is configured to adjust the switching frequency to a frequency that is substantially equal to a fundamental frequency of the load when the generator is operating at a speed that is substantially equal to its synchronous speed.

9. The system of claim 8, wherein the frequency is within +/−5% of the fundamental frequency.

10. The system of claim 8, wherein the rotor speed is within about +/−5% of the synchronous speed.

11. The system of claim 8, wherein the load comprises an electrical grid and wherein the fundamental frequency is equal to about 50 Hz or about 60 Hz.

12. The system of claim 8, wherein the power converter comprises a rotor side converter and a line side converter, the at least one switching element forming part of the rotor side converter.

13. The system of claim 8, wherein the generator is a wind-driven doubly fed induction generator.

14. The system of claim 8, wherein the at least one switching element comprises an insulated gate bipolar transistor (IGBT).

15. A wind turbine system for supplying power for application to a load, the wind turbine system comprising:
   a wind turbine rotor, the wind turbine rotor including a hub and a plurality of rotor blades coupled to the hub;
   a doubly fed induction generator coupled to the wind turbine rotor;
   a power converter coupled to the doubly fed induction generator, the power converter including a rotor side converter and a line side converter, the rotor side converter including at least one switching element; and
   a controller configured to provide control commands to adjust a switching frequency of the at least one switching element, wherein the controller is configured to adjust the switching frequency to a frequency that is substantially equal to a fundamental frequency of the load when the doubly fed induction generator is operating at a speed that is substantially equal to its synchronous speed.

16. The system of claim 15, wherein the frequency is within +/−5% of the fundamental frequency.

17. The system of claim 15, wherein the rotor speed is within about +/−5% of the synchronous speed.

18. The system of claim 15, wherein the load comprises an electrical grid and wherein the fundamental frequency is equal to about 50 Hz or about 60 Hz.

19. The system of claim 15, wherein the at least one switching element comprises an insulated gate bipolar transistor (IGBT).

* * * * *